Oct. 3, 1967
D. BUCCICONE
3,344,645
MAGNETIC STRIP CONVEYOR
Filed May 13, 1965
4 Sheets-Sheet 3
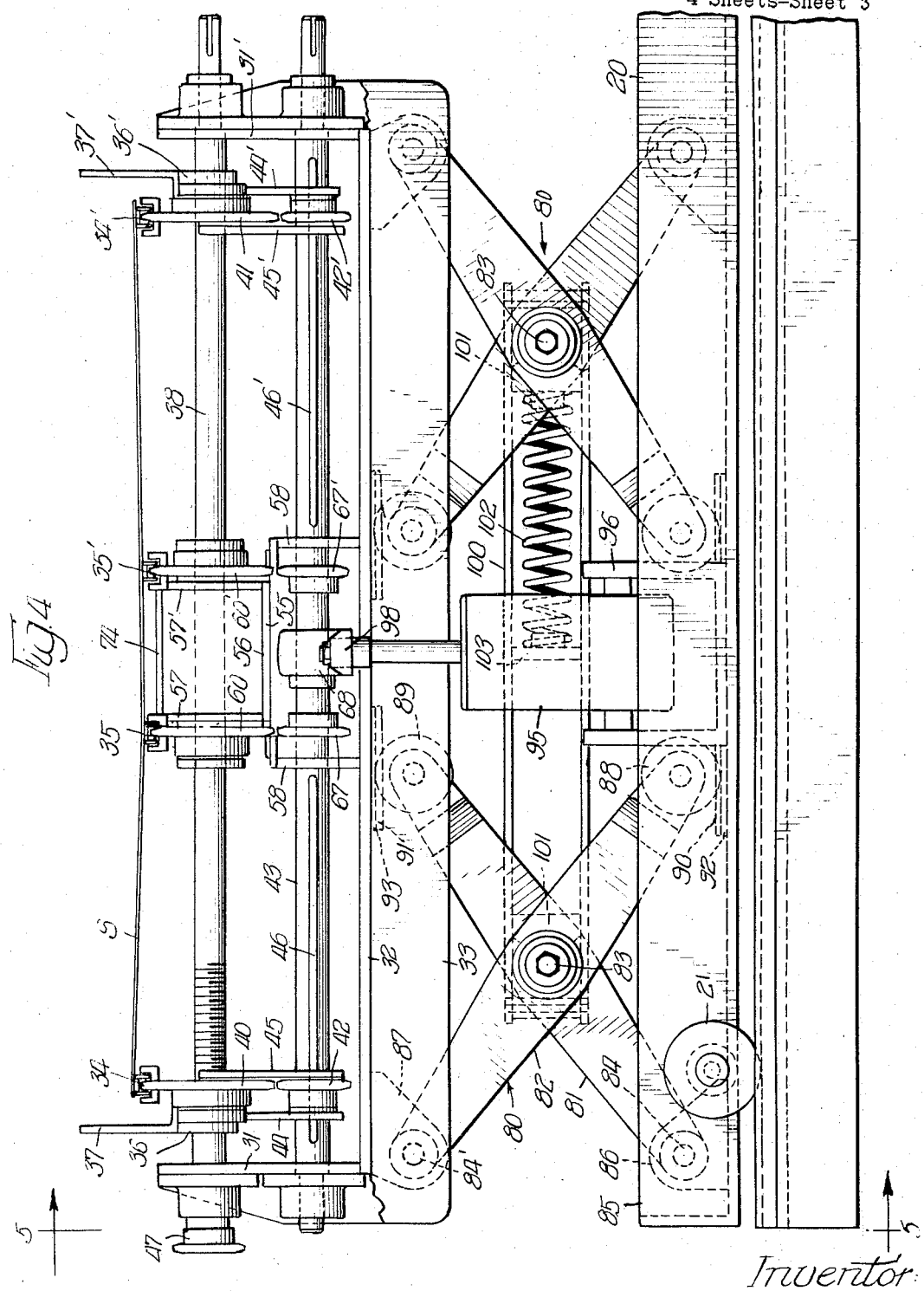
Inventor
Dario Buccicone,
By Grist, Lockwood, Greenawalt & Dewey
Attys Inventor:
Dario Buccicone,
By Hirst, Lockwood, Greenawalt & Dewey
Attys ously, of the invention to provide a # United States Patent Office 3,344,645
Patented Oct. 3, 1967

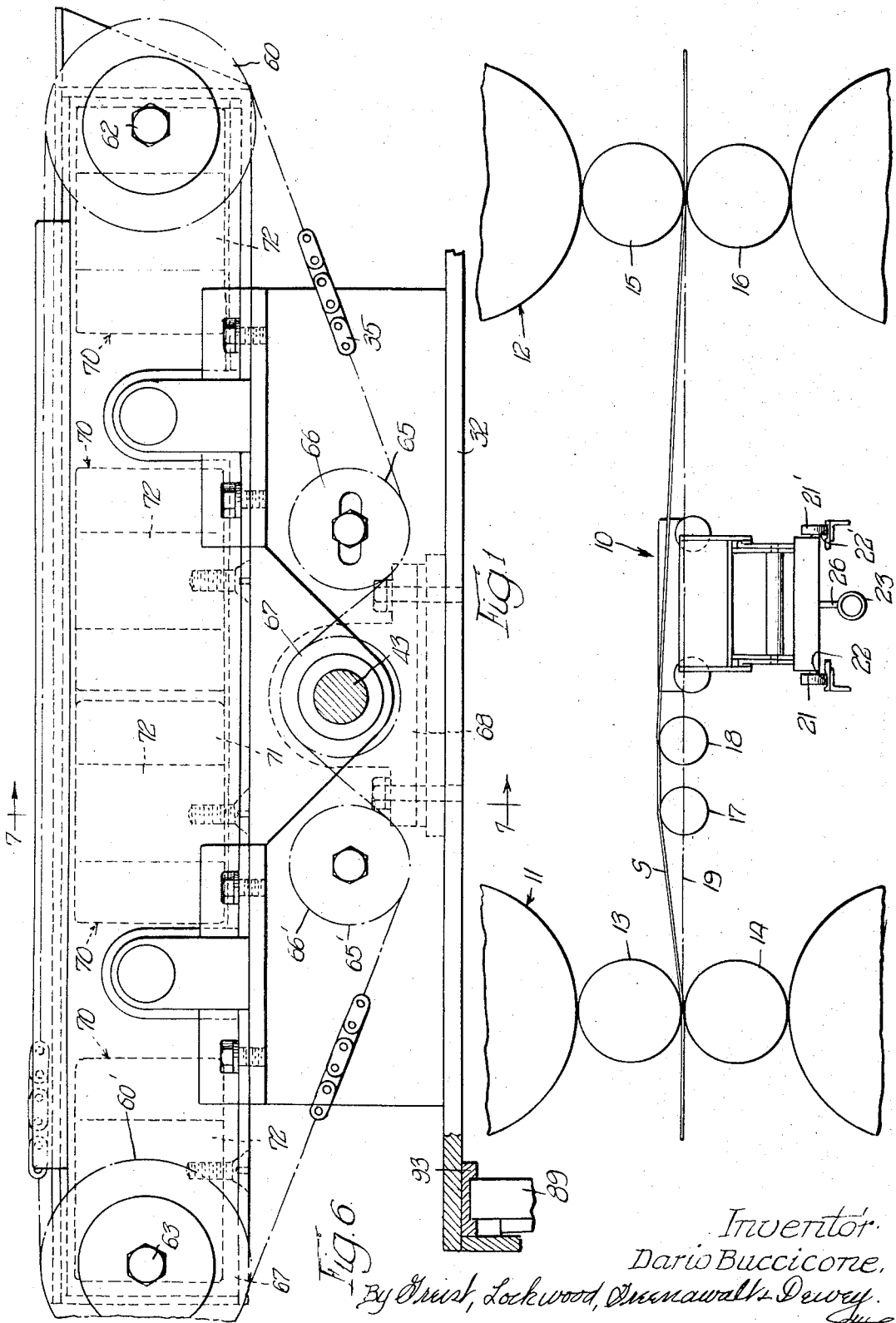

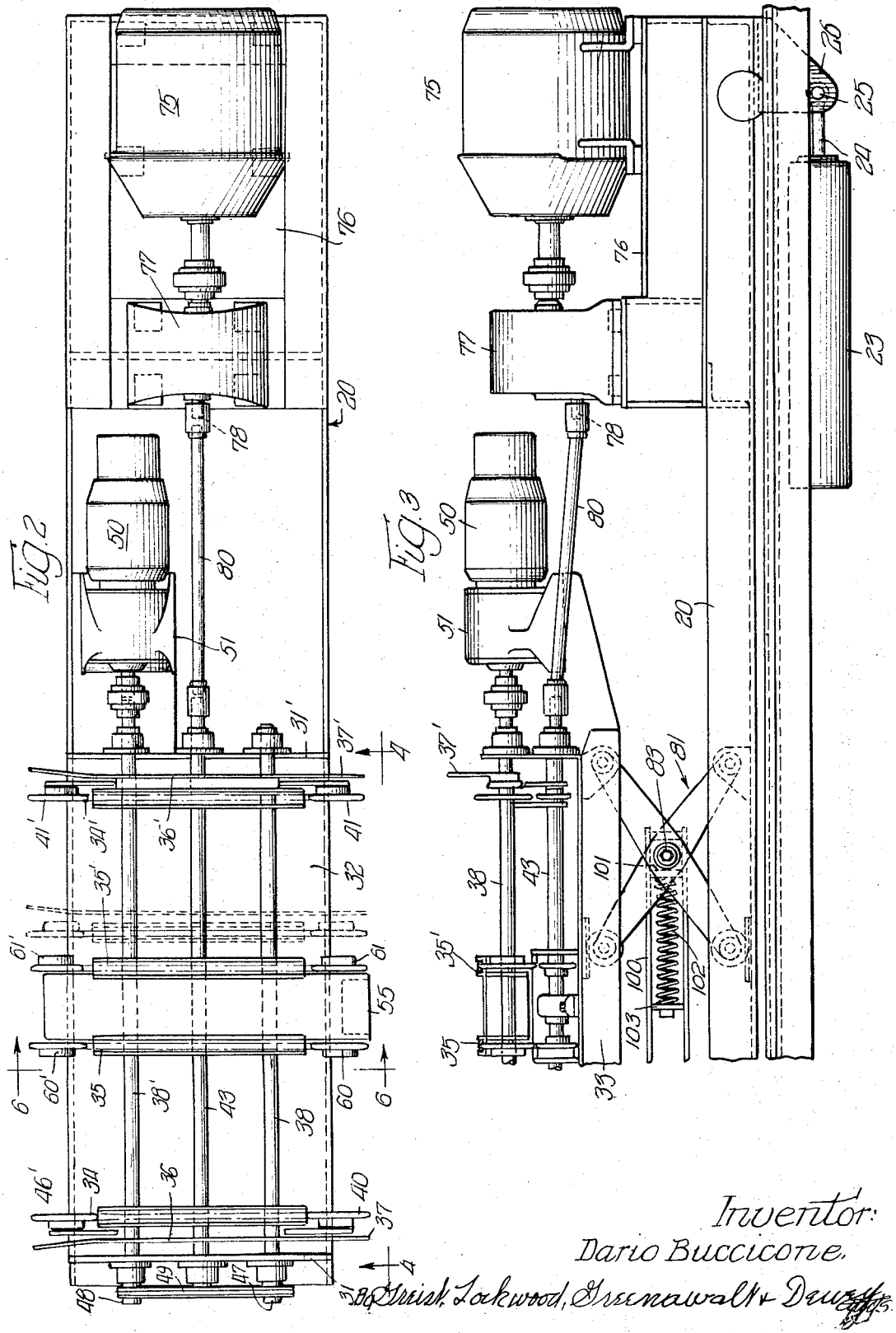

3,344,645
MAGNETIC STRIP CONVEYOR
Dario Buccicone, Gary, Ind., assignor to Buccicone Engineering Co., Inc., Gary, Ind., a corporation of Indiana
Filed May 13, 1965, Ser. No. 455,512
15 Claims. (Cl. 72—251)

This invention relates to material handling and is more particularly concerned with improvements in apparatus for supporting and advancing a metal strip in a processing line.

With the advent of high speed rolling mill operations, the threading of the metal strip while it is traveling at high speed through various stands has created a problem because the distance between the successive stands is often relatively large and as the strip advances and is rolled thinner it also becomes limber so that it must be supported while it is pushed by the rolls in the one stand to the next succeeding stand. The problem is complicated by the high rate of speed at which the strip is advanced and the need for guiding the strip so that threading of the leading end of the strip between the rolls of the succeeding stand is accomplished without damage to the strip and the roll equipment. It is a general object, therefore, of the invention to provide a method and apparatus for guiding and supporting a fast traveling metal strip as it is pushed forward by the exit rolls in a mill stand so that it is threaded between the entrance rolls of the next stand in the processing line in an efficient manner without reducing the speed of travel of the strip.

It is a more specific object of the invention to provide a specially designed conveyor for supporting and accurately threading the leading end of a metal strip between the rolls of a mill stand which is spaced a substantial distance from the discharge side of a preceding mill stand in a processing line.

It is a further object of the invention to provide a conveyor for supporting and advancing a metal strip which is advanced between a pair of spaced mill stands so that a sufficient degree of stiffness is imparted to the strip to hold the leading section thereof in the pass line for threading between the rolls of a succeeding mill stand.

It is another object of the invention to provide a conveyor unit adapted to be positioned between a pair of spaced mill stands for guiding a traveling metal strip from the one mill stand to the next wherein the conveyor is provided with means for supporting the edges of the strip and for drawing the middle portion of the strip out of the plane of the edges so as to impart a stiffening curvature thereto and prevent sagging of the strip as the forward end is advanced for threading between the rolls of the receiving stand.

It is a still further object of the invention to provide a conveyor unit adapted to be positioned between a pair of spaced mill stands in a strip processing line wherein traveling chains are provided for supporting the edges of the strip while it is advancing and a center portion of the strip is subject to a magnetic pull so as to impart a stiffening curvature to the strip and prevent the leading edge portion from dropping out of line whereby to insure proper threading as the leading edge of the strip is advanced to the rolls of the receiving mill stand.

It is still another object of the invention to provide a conveyor for the purpose described which includes adjustable side edge guides so as to readily adapt the conveyor to the handling of strips of different widths.

A still further object of the invention is to provide a strip supporting and conveying apparatus which is vertically adjustable so as to permit raising and lowering the path traversed by the strip and which is also mounted so that it may be readily moved to clear the area between the mill stands.

These and other objects and advantages of the invention will be apparent from a consideration of the strip supporting and conveying apparatus which is shown by way of illustration in the accompanying drawings wherein:

FIGURE 1 is a side elevation, partially diagrammatic, showing a pair of adjoining mill stands with a strip supporting conveyor mounted between the same which embodies the principal features of the invention;

FIGURE 2 is a plan view of the strip supporting conveyor, to a larger scale;

FIGURE 3 is a partial side elevation of the strip supporting conveyor of FIGURE 2;

FIGURE 4 is a view taken on the line 4—4 of FIGURE 2 to a still larger scale, the view being in a transverse plane relative to the direction of movement of the strip across the conveyor;

FIGURE 6 is a cross section taken on the line 6—6 of FIGURE 2 to a larger scale.

Figure 5:
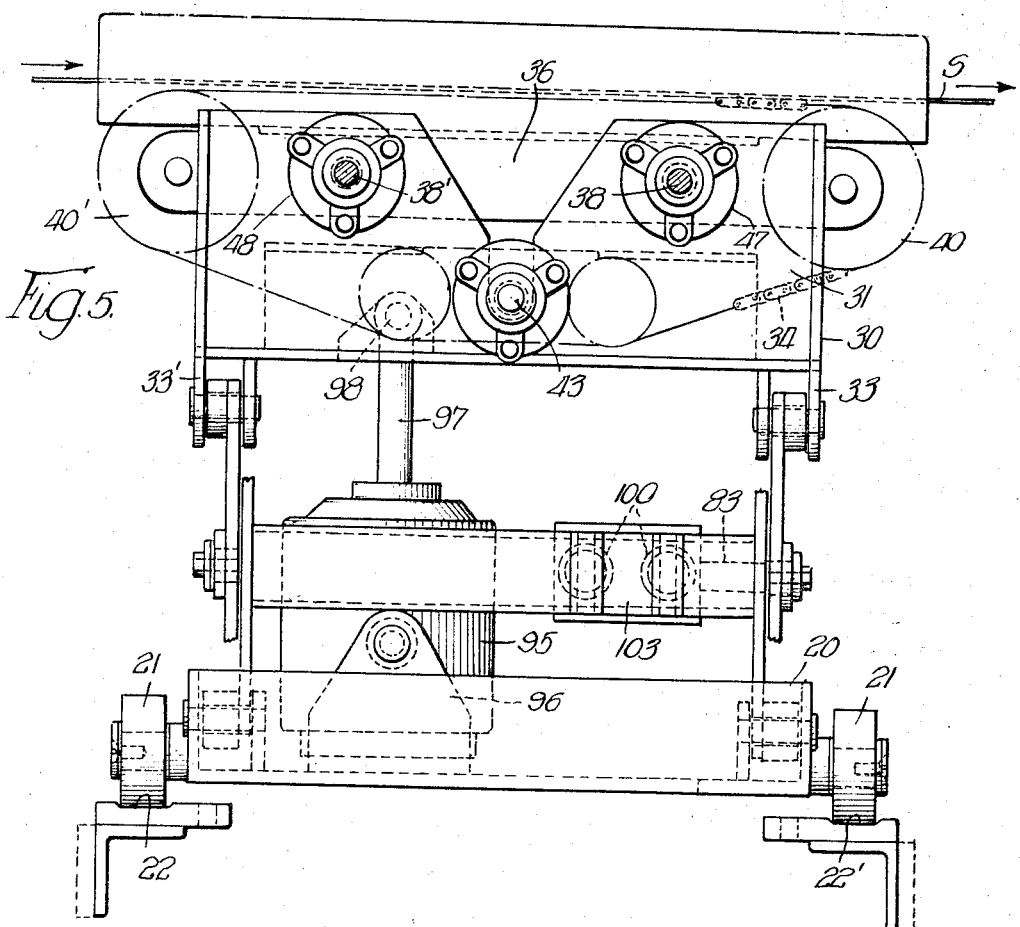
FIGURE 5 is a view taken on the line 5—5 of FIGURE 4.
Figure 7:
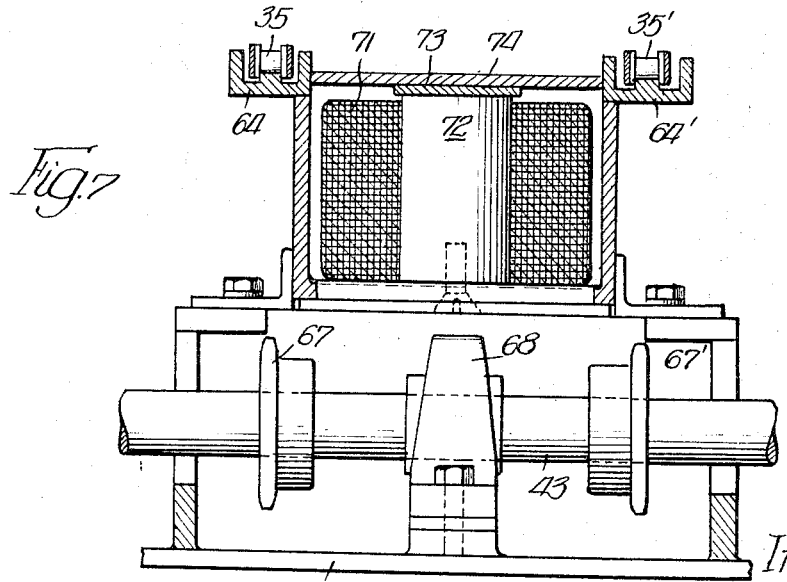
FIGURE 7 is a cross section taken on the line 7—7 of FIGURE 6.

Referring first to FIGURE 1, there is illustrated a conveyor 10 positioned between a pair of conventional mill stands which are spaced apart in a strip rolling mill and which are indicated diagrammatically at 11 and 12. The strip material S is adapted to be advanced by driven rollers 13 and 14 from the exit or discharge side of the mill stand 11 and fed to or threaded between the entrance or receiving rollers 15 and 16 of the mill stand 12. The conveyor 10 is adapted to support the strip S and advance the same between the stands 11 and 12, the strip being lifted somewhat above the pass line which is indicated at 19 by supplemental support rollers 17 and 18 which are positioned adjacent the rollers 13 and 14.

The conveyor apparatus 10 is mounted on a truck forming base frame 20 (FIGURES 2 to 5) which is provided at its four corners with supporting wheels 21. The wheels 21 are adapted to ride in track formations 22 and 22' provided between the mill stands 11 and 12 and extending transversely of the direction of advance of the strip S so that the conveyor apparatus 10 may be moved laterally into and out of position beneath the pass line 19. A fluid actuated cylinder 23 is mounted beneath the tracks 22 and 22' with its piston 24 pivotally connected at 25 to a bracket 26 depending from the frame 20 to provide for power shifting of the conveyor 10 to an out-of-the-way position when access is desired to the area between the mill stands.

The conveyor apparatus 10 is carried by a rectangular frame 30 mounted for vertical adjustment above the truck frame 20. The frame 30 comprises side members 31 and 31' extending in vertical planes upwardly along opposite sides of a horizontally disposed base plate 32 and end plates 33 and 33' which are of U shape and which extend in vertical planes downwardly from the side edges of the base plate 32 and outwardly in opposite directions from the end edges of the side plates 31 and 31' so as to provide flange-like members along the side and end edges of these plates, resulting in the frame 30 having the form of an upwardly opening tray within which there is mounted two pairs of parallel endless chains 34, 34' and 35, 35'. The center chains 35 and 35' are disposed on opposite sides of the center line of the apparatus which in the operative position thereof is aligned approximately with the longitudinal center line of the path of the strip E. The side chains 34 and 34' are mounted in laterally spaced, laterally adjustable relation on side guide supporting plates 36 and 36' and are adapted to support the side margins of the strip S as it is guided across the conveyor apparatus between parallel, vertically extending side guide rails 37 and 37'. The side guide and chain supporting plates 36 and 36' are in turn supported in vertically disposed, laterally adjustable relation on a pair of cross shafts 38 and 38' which are provided with right and left hand screw threads at opposite ends so that rotation thereof moves the side guide supports 36 and 36' toward and from the center line of the machine. The cross shafts or screws 38 and 38' are journaled in suitable flanged bearings on the vertically disposed side frame plates 31 and 31'. The chains 34 and 34' are carried on end sprockets 40, 40' and 41, 41' which are rotatably mounted on the ends of the side guide support plates 36 and 36' so that they move laterally of the center of the apparatus with the side edge guide rails 37 and 37', the latter extending above the top runs of the chains 34 and 34' on which the side margins of the strip S are supported. Upwardly opening track forming channels are mounted on the side guide supports 36 and 36' for holding the top run of the chains 34 and 34' in a fixed horizontal plane. The chains 34 and 34' are driven by sprockets 42 and 42' which are rotated by a cross drive shaft 43 journaled in suitable flange bearings on the side plates 31 and 31'. The sprockets 42 and 42' are mounted on depending bracket plates 44, 45 and 44', 45' on the side guide support plates 36 and 36', respectively so that they are adjustable with the chains 34 and 34' laterally of the apparatus. The drive shaft 43 has elongate, axially extending keys 46 and 46' for connecting the sprockets 42 and 42' for axial sliding movement thereon.

The two adjusting screws 38 and 38', for the side guide supports 36 and 36' are connected for simultaneous rotation by sprockets 47, 48 and chain 49 (FIGURES 2 and 4). The one screw 38 is coupled to a motor driven gear reduction unit 50 (FIGURE 2) which is supported on a bracket 51 extending from the frame 30.

The center chains 35 and 35' are mounted on opposite sides of an elongate box-like center frame 55 having a base plate 56 and upstanding side plates 57 and 57' which are disposed in vertical, parallel, laterally spaced planes. The frame 55 is supported in elevated relation above the base plate 32 by bracket members 58. The chains 35 and 35' are carried on pairs of end sprockets 60, 60' and 61, 61' rotatably mounted on stub shafts 62 and 63 journaled in the side frame plates 57 and 57'. The chains 35, 35' have their upper runs supported for movement in a horizontal plane by elongate, upwardly opening, track forming channel members 64 and 64' which are mounted on the upper edges of the side frame plates 57 and 57'. The channel members 64 and 64' are at an elevation which places the strip supporting top surfaces of the chains in a horizontal plane somewhat below the plane of the top surfaces of the upper runs of the strip side edge supporting chains 34 and 34'. The lower runs of the chains 35 and 35' pass around spaced idler sprockets 65, 65' and 66, 66' and engage with drive sprockets 67, 67' mounted on the cross drive shaft 43 on opposite sides of a pillow block 68 supporting the center of the shaft 43 so that chains 34, 34' and chains 35, 35' are driven by the one shaft 43.

A plurality of electromagnets 70 are mounted within the frame 55 with each of the magnets 70 comprising a coil 71 and a vertically disposed core member 72. An elongate plate 73 is mounted on the non-magnetic top plate 74 of the box 55 and connects the cores 72 so as to exert a downward pull on the center portion of the ferrous metal strip S passing above the same sufficient to hold the center portion of the strip in engagement with the chains 35 and 35' and give the strip a stiffening bow.

The cross drive shaft 43 is driven by a motor 75 which is mounted on a support frame 76 upstanding at the end of the truck frame 20. The motor 75 is connected in driving relation to a gear reduction unit 77 and the end of the cross drive shaft 43 is connected to the power output shaft 78 of the gear reduction unit 77 by a shaft assembly 80 having a flexible connection at each of its ends to the shafts 43 and 78, respectively, so as to accommodate vertical movement of the shaft 43, permitting the height of the sheet supporting table or upper frame 30 to be adjusted while the shaft 43 is driven by the motor 75.

The chain carrying upper frame 30 is connected to the truck frame 20, for vertical movement relative to the frame 20, by four crossed bar or crossed plate devices 80 each having a scissors-like movement and guiding the frame 30 in a vertical path above the truck frame 20. The scsisors-like connecting devices 80 are of identical construction. Each device 80 comprises two elongate plate members 81 and 82 connected intermediate their ends by a pivot shaft 83 extending across the machine. Corresponding ends of the two plate members 81 and 82 are pivotally connected to the bottom frame 20 and the top frame 30, respectively, by pivot pins 84 and 84' mounted with their axes parallel and in vertical alignment. The lowermost pin 84 extends between a side frame plate 85 and the parallel leg of an inwardly spaced bracket 86. The upper pin 84' extends between a depending portion of the plate 33 and the parallel leg of a depending bracket 87 which is spaced inwardly thereof. At their other ends the connecting bars or plates 81 and 82 carry anti-friction rollers 88 and 89 which engage in tracks 90 and 91 provided in upwardly facing and downwardly facing bearing plates 92 and 93 which are mounted within the frames 20 and 30, respectively. The connecting devices 80 are arranged in pairs at opposite ends of the frame 30 as shown in FIGURE 4 and operate to hold the top frame 30 in parallel relation with the bottom frame 20 as it is raised and lowered by operation of a fluid cylinder 95. The cylinder 95 is pivotally mounted in a bracket 96 in the bottom frame 20 and has a piston 97 pivotally connected to a suitable bracket 98 secured on the base plate 32 of the upper frame 30.

In order to counterbalance the weight of the conveyor table 30 and its associated mechanism, an elongate housing 100 extends, in parallel relation with the side plates 33 and 33' of the upper frame 30, between the pivot shafts 83 and receives in sliding relation at its opposite ends pivot blocks 101 carried on the shafts 83. A compression spring 102 is disposed in the housing 100 with one end of the spring seated against a fixed cross member 103 in the center of the housing 100 and the other end of the spring bearing against the pivot block 101 in one end of the housing.

In using the apparatus, the cylinder 23 is operated so as to move the truck 20, with the table frame 30 lowered, into position beneath the pass line 19, the center line between the two runs of the center conveyors 35 and 35' being approximately aligned with the longitudinal center line of the path of the strip which is being handled in the mill rolls 11 and 12. The conveyor table 30 is then raised by operation of the cylinder 95 to bring it to the proper level for supporting the strip S and advancing the same for threading between the rolls 15 and 16. The magnetic coils 70 are, of course, supplied with current so as to pull down the center of the strip and provide the same with a stiffening curvature so that it advances in a relatively straight path.

While particular materials and specific details of construction are referred to in describing the illustrated form of the apparatus, it will be understood that other materials and equivalent structural details may be resorted to within the spirit of the invention.

I claim:
1. An apparatus for supporting and conveying a flat metal strip between one mill stand and the next succeeding mill stand in a strip processing line, said apparatus comprising a vertically adjustable frame having mounted thereon a pair of laterally spaced, endless side chains with horizontally disposed upper runs for supporting the strip along its side margins and a pair of endless center chains with horizontally disposed upper runs for supporting the strip along its center portion, said side chains being mounted on laterally adjustable frame members having associated side guide rails for holding the strip in a predetermined path, the center chains being mounted on opposite sides of a box-like frame with the upper runs thereof traveling in a plane offset below the corresponding plane in which the upper runs of the side chains are traveling, a plurality of magnets arranged in the box-like frame between the center chains with pole pieces extending vertically and with the upper ends of the pole pieces connected by an elongate bar forming member extending between the upper runs of the center chains so as to exert a pull on the strip and draw the center portion thereof down against the upper runs of the center chains, power means operative to drive the chains in the same direction whereby to advance the strip across the conveyor and to bow the strip transversely so as to stiffen the leading portion as it is advanced to the entrance side of the next succeeding mill stand.

2. An apparatus for supporting and conveying a flat metal strip between one mill stand and the next succeeding mill stand in a strip handling line, said apparatus comprising an upright stand having a vertically adjustable frame thereon, a pair of laterally spaced, parallel, endless side chains mounted on said frame and having horizontally disposed upper runs for supporting marginal portions of the strip, a pair of parallel, endless center chains having horizontally disposed upper runs for supporting the center of the strip on the upper runs thereof, laterally adjustable support members on said frame having side guide rails for holding the strip in a predetermined path, the center chains being mounted on said frame with the upper runs traveling in a plane which is offset vertically relative to the corresponding plane in which the upper runs of the side chains are traveling, a plurality of magnets associated with the center chains and having pole pieces extending vertically and connected by an elongate bar forming pole extension member so as to force the center portion of the strip against the upper runs of the center chains, power means operative to drive the chains in the same direction so as to advance the strip across the conveyor and to bow the strip transversely so as to stiffen the same as it is advanced to the entrance side of the next succeeding mill stand.

3. An apparatus for supporting and conveying a flat meal strip between one mill stand and the next succeeding mill stand in a strip handling line, said apparatus comprising an upright stand having a vertically adjustable frame thereon, a pair of laterally spaced, parallel, endless side chains mounted on said frame and having horizontally disposed upper runs for supporting side portions of the strip, a pair of parallel, endless center chains having horizontally disposed upper runs for supporting the center portion of the strip, laterally adjustable support members extending in the direction of advance of said strip on said frame, side guide rails on said adjustable support members for holding the strip in a predetermined path, the center chains being laterally spaced along the center of said frame with the upper runs traveling in a plane which is offset vertically relative to the corresponding plane in which the upper runs of the side chains are traveling, a plurality of magnets disposed between the center chains and having pole pieces connected by an elongate bar forming pole extension member extending parallel with the upper runs of the center chains so as to exert a magnetic force on the strip and hold the center portion of the strip against the upper runs of the center chains, power means connected to said chains to drive the chains in the same direction and to advance the strip across the conveyor with the strip bowed transversely so as to stiffen the same and facilitate guiding the leading end to the next succeeding mill stand.

4. An apparatus as recited in claim 3, and said upright stand including a bottom frame, a plurality of crossed bar connecting members between the bottom frame and the vertically adjustable frame which are operative to hold the frames in vertical alignment, and power means for raising and lowering the vertically adjustable frame.

5. An apparatus as recited in claim 3, and said upright stand having a bottom frame with supporting wheels, a track extending transversely of the path of advance of the strip on which the stand is supported, and power means for shifting the stand to an inoperative position at one side of the path of the strip.

6. An apparatus for supporting and conveying a metal strip between one mill stand and the next succeeding mill stand in a strip handling line, said apparatus comprising an upright stand having a vertically adjustable, table forming frame, a pair of laterally spaced, elongate, endless side chains with horizontally disposed upper runs mounted on said stand for supporting side portions of the strip, an elongate, endless center chain with a horizontally disposed run mounted on said stand for supporting the strip along its center portion, said side chains having associated side guide rails for holding the strip in a predetermined path, the center chain being mounted on said stand with the upper run thereof traveling in a plane offset relative to the corresponding plane in which the upper runs of the side chains are traveling, a plurality of magnets associated with the center chain and exerting a magnetic force on the center portion of the strip so that it is held against the center chain, power means operative to drive the chains in the same direction whereby to advance the strip across the conveyor and to bow the strip transversely so as to stiffen the strip as it is advanced to the entrance side of the next succeeding mill stand.

7. A supporting and conveying apparatus for threading a metal strip between spaced mill stands, comprising an upright frame, a pair of parallel, endless side chains mounted in laterally adjustable relation on said frame and providing horizontally disposed upper runs for supporting the edges of the strip, a pair of parallel, endless chains mounted between said side chains with the top runs thereof horizontally disposed and at a lower level than the corresponding runs of the side chains, magnets associated with said center chains for drawing the center of the strip downwardly relative to the side margins thereof so as to bend the strip sufficient to stiffen the same, and means for driving the chains to advance the strip.

8. A supporting and conveying apparatus for threading a metal strip between spaced mill stands, comprising an upright support having a bottom frame and a vertically adjustable top frame, a pair of parallel, endless side chains mounted in laterally adjustable relation on said top frame with upper runs for supporting the side margins of the strip, a pair of parallel, endless chains mounted on said top frame between said side chains with upper runs at a lower level than the corresponding runs of the side chains, magnets associated with said center chains for drawing the center of the strip downwardly relative to the side margins thereof so as to bend the strip and stiffen the same, means for driving the chains to advance the strip and power means for raising and lowering the top frame.

9. A supporting and conveying apparatus for threading a metal strip between spaced mill stands, comprising an upright frame, a pair of parallel, endless side chains mounted on said frame with the upper runs disposed horizontally for supporting the side portions of the strip, an endless center chain mounted between said side chains with the top run thereof disposed horizontally and at a lower level than the corresponding runs of the side chains, magnets associated with said center chain for forcing the center of the strip toward said center chain so as to bend the strip and to stiffen the same, and means for driving certain of the chains to advance the strip.

10. A supporting and conveying apparatus for threading a metal strip between spaced mill stands, comprising an upright frame, a pair of parallel, relatively narrow, endless conveyor runs mounted in horizontally disposed, laterally adjustable relation on said frame for supporting side edge portions of the strip, a center conveyor run mounted between said side conveyor runs at a lower level, magnets associated with said center conveyor run for drawing the center of the strip toward the same so as to bend the strip sufficiently to stiffen the same substantially and prevent sagging thereof as the strip advances.

11. A supporting and conveying apparatus for threading a metal strip between spaced mill stands, comprising an upright support having a bottom frame and a vertically adjustable top frame, a pair of parallel, endless side conveyors adjustably mounted on said top frame with the upper run thereof supporting the side margins of the strip, a pair of parallel, endless center conveyors mounted on said top frame between said side conveyors with the upper runs thereof at a level lower than the corresponding runs of the side conveyors, magnets associated with said center conveyors for drawing the center of the strip downwardly relative to the side margins thereof so as to bend the strip about its longitudinal axis and stiffen the same, means for driving certain of the conveyors to advance the strip and means for raising and lowering the top frame.

12. An apparatus for conveying a metal strip between spaced mill stands, comprising an upright frame, a pair of parallel, endless side conveyors mounted in laterally adjustable relation on said frame and providing horizontally disposed upper runs for supporting the side margins of the strip, an endless conveyor mounted between said side chains with the top run thereof horizontally disposed and at a lower level than the corresponding run of the side chains, magnets associated with said center conveyor for drawing the center of the strip downwardly relative to the side margins thereof so as to bend the strip sufficiently about its longitudinal axis to stiffen the same, and means for driving a side conveyor so that the strip is advanced across the apparatus to the next mill stand.

13. A supporting and conveying apparatus for threading a metal strip between spaced roll supporting stands, comprising an upright support having a vertically adjustable top frame, a pair of parallel, endless side conveyors mounted on said top frame with upper runs for supporting the strip at its side margins, a parallel, endless conveyor mounted on said top frame between said side conveyor with an upper run at a different level than the corresponding runs of the side chains, means associated with said center conveyor for forcing the center portion of the strip out of the plane of the side margins thereof so as to bend the strip about its longitudinal axis and stiffen the same, means for driving certain of the conveyors whereby the strip is advanced, and power means for raising and lowering the top frame.

14. An apparatus for supporting a metal strip between spaced mill stands, comprising an upright frame, a pair of parallel, endless side conveyors mounted on said frame with the upper runs disposed in a horizontal plane and supporting the side portions of the strip, an endless center conveyor means mounted between said side conveyors with the top run thereof disposed in a horizontal plane and at a different level than the corresponding runs of the side conveyors, and means associated with said center conveyor for forcing the center of the strip toward said center conveyor so as to bend the strip and stiffen the same.

15. An apparatus for supporting and advancing a metal strip between one mill stand and an adjoining mill stand in a strip handling line, said apparatus comprising a portable stand adapted to be positioned beneath the normal pass line for the strip and having a vertically adjustable top frame, a pair of laterally spaced, narrow, side conveyor members having a top surface for supporting the edges of the strip and a center conveyor having a surface for engaging a portion of the strip intermediate its side edges, said side having associated side guide members for holding the strip in a predetermined path, the center conveyor surface being in a plane which is offset relative to the plane in which the top surfaces of the side conveyors are traveling, means associated with the center conveyor for exerting a pull on the strip so as to draw the center portion thereof against the surface of the center conveyor, power drive means for certain of the conveyors operative to advance the strip across the apparatus with the strip bowed so as to stiffen the same as it is advanced toward the next succeeding mill stand.

References Cited
UNITED STATES PATENTS

| | | | |
|---|---|---|---|
| 1,809,076 | 6/1931 | Shinn et al. | 214—6 |
| 2,193,162 | 3/1940 | Carter | 198—141 |
| 2,947,429 | 8/1960 | Buccicone | 214—6 |

RICHARD J. HERBST, *Primary Examiner.*

H. D. HOINKES, *Assistant Examiner.*